United States Patent [19]

Meeks

[11] 4,110,696

[45] Aug. 29, 1978

[54] AUDIO ECCENTRIC CONNECTOR PLUG

[76] Inventor: Emett O. Meeks, P.O. Box 10493 Oklahoma City, Okla. 73110

[21] Appl. No.: 758,362

[22] Filed: Jan. 10, 1977

[51] Int. Cl.[2] .......................... H04B 1/10; H01R 13/20; H01R 13/54

[52] U.S. Cl. .................................. 325/480; 179/1 PC; 339/91 P; 339/176 S; 339/183

[58] Field of Search .................... 179/1 PC; 339/88 R, 339/91 R, 91 P, 176 S, 183, 88 C; 325/480, 488

[56] References Cited

U.S. PATENT DOCUMENTS

| | | | |
|---|---|---|---|
| 2,185,966 | 1/1940 | Pfanstiehl | 325/480 |
| 3,101,986 | 8/1963 | Lyman, Jr. | 339/91 R |
| 3,413,417 | 11/1968 | Cornell | 179/1 PC |

*Primary Examiner*—Robert L. Griffin
*Assistant Examiner*—Marc E. Bookbinder
*Attorney, Agent, or Firm*—Robert K. Rhea

[57] ABSTRACT

An audio connector plug, insertable into an external speaker jack, is provided with an eccentric terminal tip for making contact with the spring terminal of the jack without interrupting audio signals to the internal speaker of an audio receiver. The other end of the connector plug is connected with a filter for reducing high frequency noise.

5 Claims, 4 Drawing Figures

AUDIO ECCENTRIC CONNECTOR PLUG

BACKGROUND OF THE INVENTION

1. Field of the Invention

The present invention relates to audio amplifiers and more particularly to a connector plug for the external speaker of a radio receiver, or the like, for reducing high frequency noise normally transmitted to the internal speaker.

Audio connector plugs are normally provided with a terminal end portion having a cam surface which separates a pair of contacts when inserted into the external speaker jack of a radio receiver for transmitting audio signals to an external speaker, or the like.

This invention eccentrically forms the terminal end of an audio connector plug for making contact with one of the separable contacts in the external speaker jack without separating the separable contacts.

2. Description of the prior art

I do not know of any patents disclosing a connector plug formed in this manner.

SUMMARY OF THE INVENTION

A generally cylindrical plug, adapted to be inserted into an audio receiver jack, is provided with a ground terminal insulated from a coaxial tip end contact. The tip end contact engages a spring contact normally contacting an audio conductor within the audio jack. The tip end contact of this connector plug is formed eccentrically to define a transverse cam surface for engaging the spring contact of separable contacts within an audio jack when in one angular position and contacting the spring contact without separation of the separable contacts when angularly rotated about its longitudinal axis to another position. A pair of wires, connected with the other end of the connector plug, are connected with an audio frequency filter.

The principal object of this invention is to provide a connector plug for insertion into an audio external speaker jack for making contact with one of the separable audio signal contacts within the jack without separating the contacts and for suppressing high frequency noise normally transmitted to the internal speaker of an audio receiver.

DESCRIPTION OF THE PREFERRED EMBODIMENT

Figure 1:
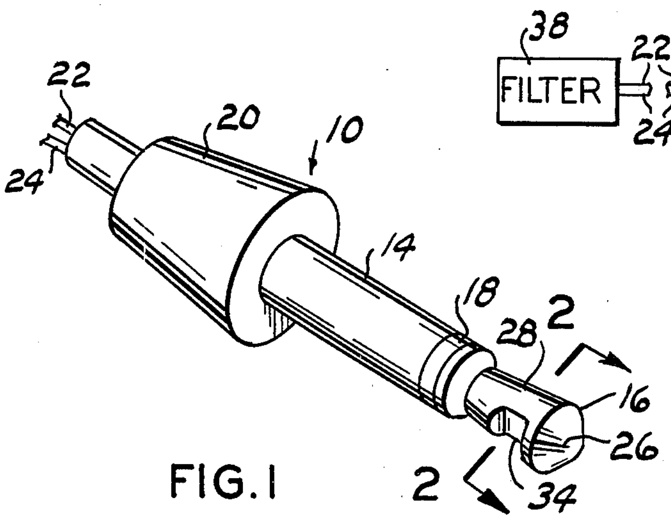
FIG. 1 is a perspective view of the connector plug.
Figure 3:
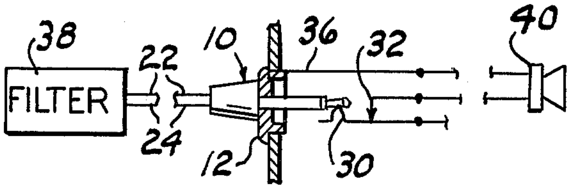
FIG. 3 is a fragmentary schematic of the connector plug in operative position within an audio receiver jack; and, FIG. 4 is an exploded perspective view illustrating the connector plug and filter secured to a sound reflector for use with one unit of a vehicular two-way communication system.
Figure 2:
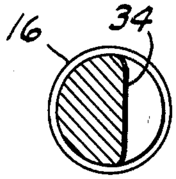
FIG. 2 is a vertical cross sectional view, to a larger scale, taken substantially along the line 2—2 of FIG. 1.

Like characters of reference designate like parts in those figures of the drawings in which they occur.

In the drawings:

The reference numeral 10 indicates a connector plug for insertion into a telephone or speaker jack 12. The plug 10 is of substantially conventional construction including a metallic cylindrical portion forming a ground contact 14 and a prong or tapered tip end contact 16 coaxially connected with the ground contact 14 and electrically insulated therefrom by a ring 18. Both contacts are connected, through an electrical non-conductive body portion 20, with a pair of wires 22 and 24, respectively. The tip end contact 16 is usually provided with an outwardly converging end surface 26 and a tapered portion 28 converging toward the axis of the ground contact 14 for the purpose of forming a longitudinal cam surface engaging the spring contact 30 of the jack 12 and separating it from contact with the audio lead contact 32 when the plug 10 is inserted into the jack.

The above description is substantially conventional with connector plugs.

In carrying out the invention, the tapered surface 28 of the prong 16 is provided with an indentation or recess 34 intermediate its ends so that the deformed tapered surface forms a transverse cam. The depth of the recess 34 is preferably not greater than the radius of the tip end 16 at the position of the recess so that when the plug 10 is inserted into the jack 12 and angularly rotated about its longitudinal axis so that the recess 34 faces toward and nests the adjacent surface of the arcuate curve of the spring contact 30, the spring contact makes with the plug tip end 16 without separating from the jack audio contact 32. In this position the plug ground contact 14 makes with the ground contact of the jack and audio wire 36 to conduct audio through the plug wires 22 and 24 which are connected at their other ends with a filter 38. In the event the plug 10 is inserted into the jacke 12 so that the jack contacts 30 and 32 are separated, determined by interruption of audio from the internal speaker 40, the plug 10 is angularly rotated manually, about its longitudinal axis to dispose the recess 34 in nesting relation with respect to the arcuate curve of the spring contact 30 which is determined by audio from the internal speaker 40.

The filter 38 then acts to reduce noise, static and distortion by clipping or chopping high frequency signals thus improving audio from the internal speaker.

Figure 4:
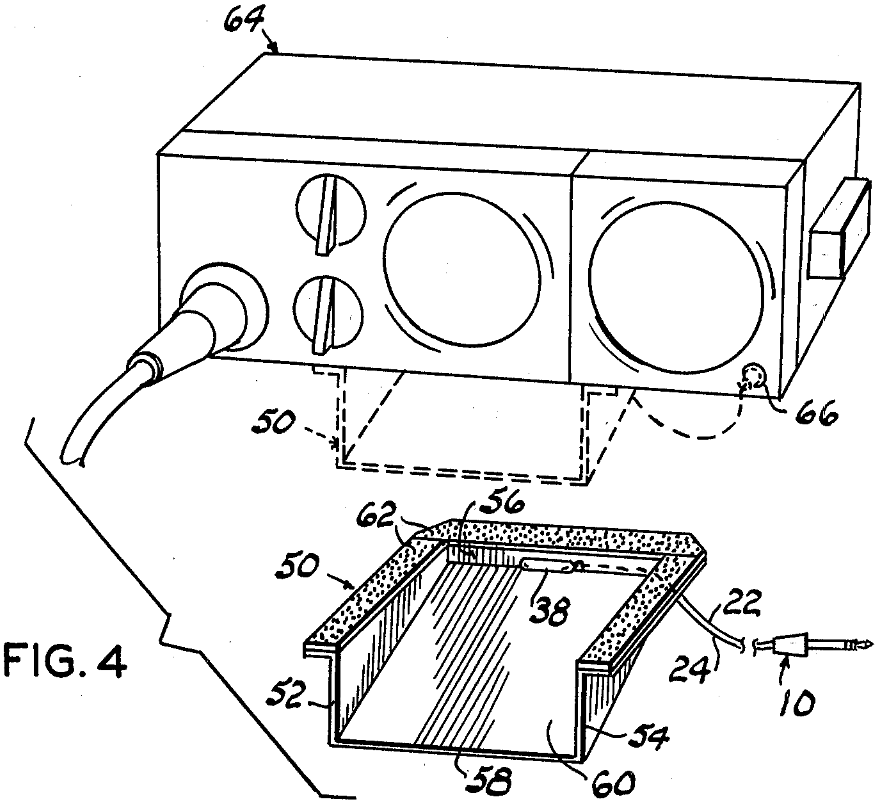

The numeral 50 indicates a sound scoop or audio reflector of generally wedge configuration defined by parallel tapered edge opposing walls 52 and 54 joined to a rearward wall 56 and a forwardly and downwardly inclined bottom wall 58 defining an open end 60 opposite the rearward wall 56. Outstanding flanges, formed on the upper edge surfaces and normal to the plane of the respective wall 52, 54 and 56, are provided with overlying adhesive magnetic material 62 for connection with the depending surface of a citizens band radio and transmitter housing 64 containing an amplifier around the position of the internal speaker therein, not shown, as illustrated by dotted lines (FIG. 4).

Obviously, the plug 10 may be used for connecting an external speaker to a receiver or for connecting the audio of one amplifier with the audio output of another amplifier.

The filter 38 is disposed within the confines of the reflector 50, preferably, adjacent its rearward wall 56 and the connector plug wires 22 and 24 extended outwardly of the reflector through a suitable aperture, not shown, so that the connector plug 10 may be inserted into the external speaker jack 66 of the radiotransceiver and angularly disposed so that the internal speaker is not disconnected for reducing noise and distortion by chopping off the high frequency noise portion present in the audio system while the audio waves are directed outwardly and away from the internal speaker.

Obviously the invention is susceptible to changes or alterations without defeating its practicability. Therefore, I do not wish to be confined to the preferred embodiment shown in the drawings and described herein.

I claim:

1. An audio signal connector plug for use with a mating jack having separable contacts, comprising:
 a plug body;
 a cylindrical contact connected at one end with said body;
 a tip end contact coaxially connected longitudinally with the other end of said cylindrical contact,
  said tip end contact having a circumferential surface converging toward the longitudinal axis of said cylindrical contact,
  said tip end contact having a longitudinal and transverse recess formed in its converging surface, the depth of the recess being no greater than the radius of the tip end contact whereby when said plug is inserted into said mating jack, said cylindrical contact and said tip end contact engage said jack contacts without separating the latter by the recess nesting one of said jack contacts when said plug body is in one angular position and separates said separable jack contacts when rotated to another angular position;
 electrical insulating means separating said contacts;
 a pair of conductors extending through said body and connected with the contacts and,
 an audio signal filter connected with said conductors opposite said contacts.

2. In a radio receiver having an audio amplifier including an internal speaker and having an external speaker jack, said jack having a pair of normally closed audio signal conducting contacts, at least one of said normally closed contacts being a spring-type contact capable of being biased out of contact with respect to the other said contact, the improvement comprising:

an elongated electrical conductor having a longitudinal axis forming a plug contact capable of entering said jack and making electrical contact therewith;
 a plug body member connected with one end of said elongated conductor for limiting movement of said elongated conductor into said jack; and,
 a tip end conductor coaxially connected in electrically insulated relation with the other end of said elongated conductor,
  said tip end conductor having a surface tapered toward said longitudinal axis and normally biasing said normally closed contacts apart when in one angular position and engaged therewith,
  said tip end conductor having a recess formed in its tapered surface capable of contactably nesting a portion of said spring-type normally closed contacts without separating the normally closed contacts when said tip end conductor is rotated to another angular position for connecting an extension speaker to the jack without disabling said internal speaker.

3. The combination according to claim 2 and further including:
 a filter; and,
 wiring connecting said filter with said plug conductors.

4. The combination according to claim 3 and further including:
 audio reflector means adapted to be connected with said receiver around the position of the internal speaker therein for supporting said filter and directing audio signals away from said receiver.

5. The combination according to claim 4 in which said reflector comprises:
 opposing side walls joined to a back wall and an inclined bottom wall for forming an open front;
 a flange secured to the edge of each wall opposite said bottom wall in a plane normal to the plane of the respective wall; and,
 magnetic material secured to each said flange.

* * * * *